Figure 1:
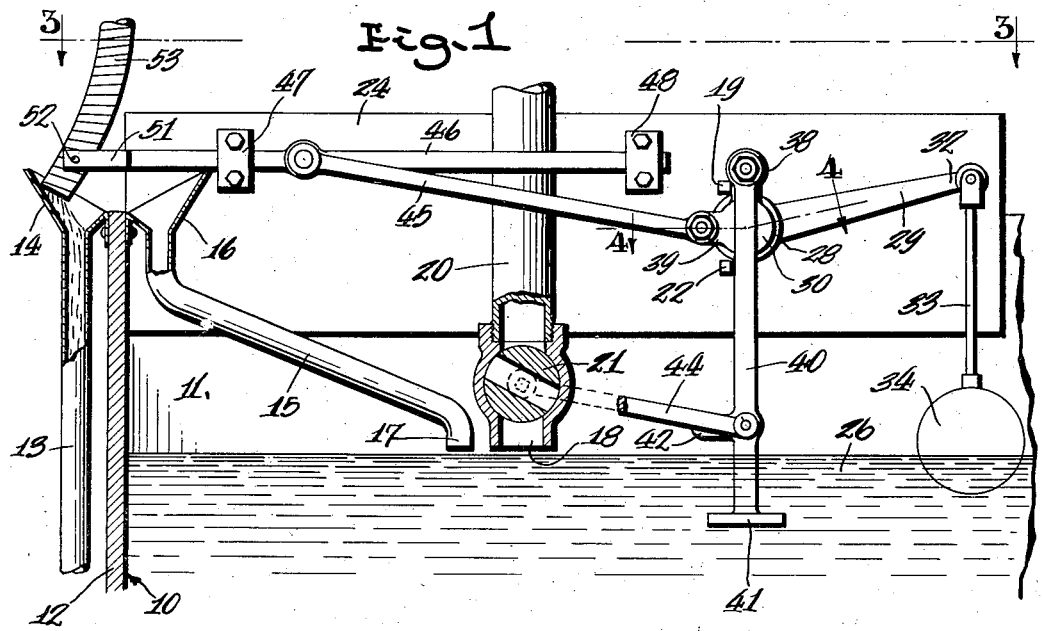

Oct. 13, 1936.  A. L. HOOVER  2,057,027
CONTROL DEVICE
Filed Nov. 6, 1933  2 Sheets-Sheet 1

ARTHUR L. HOOVER
INVENTOR

BY Freeman and Weidman
ATTORNEYS

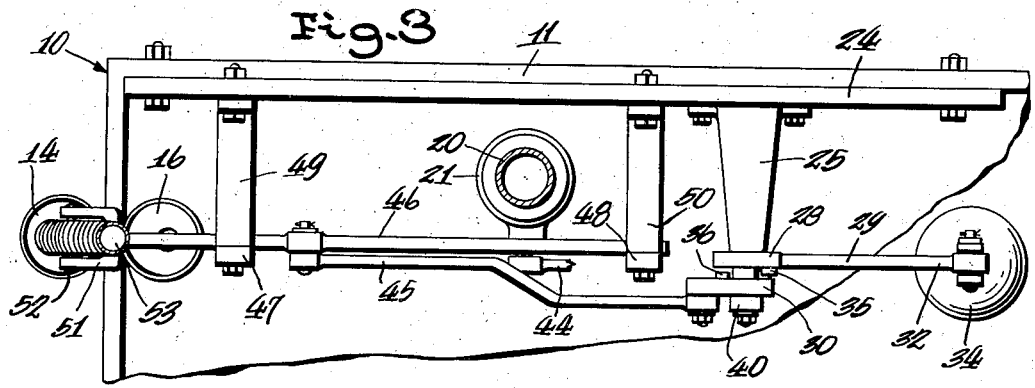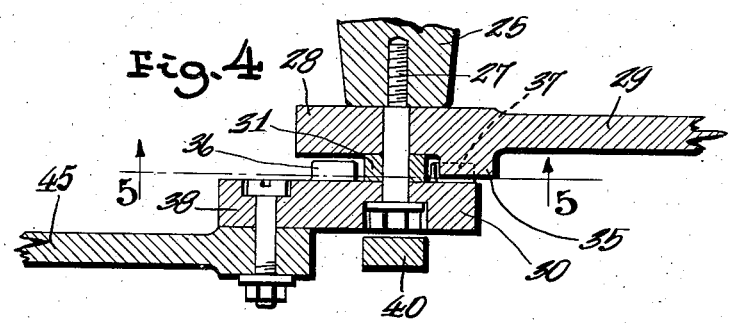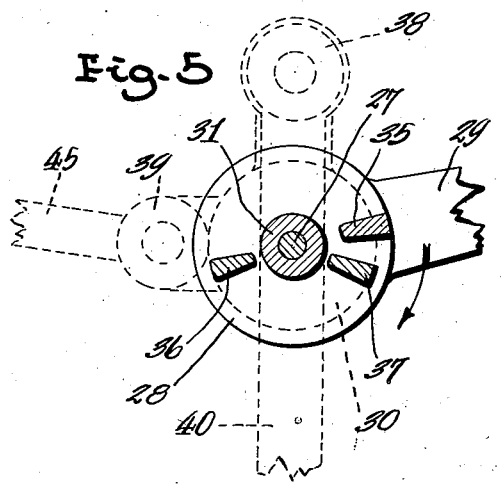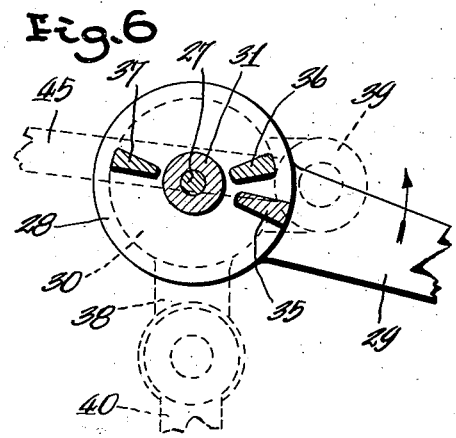

Patented Oct. 13, 1936

2,057,027

UNITED STATES PATENT OFFICE 2,057,027

CONTROL DEVICE

Arthur L. Hoover, Avery, Ohio

Application November 6, 1933, Serial No. 696,840

12 Claims. (Cl. 210—21)

This invention relates to control devices, and an object of the invention is to provide a new and improved device of this character.

Figure 2:
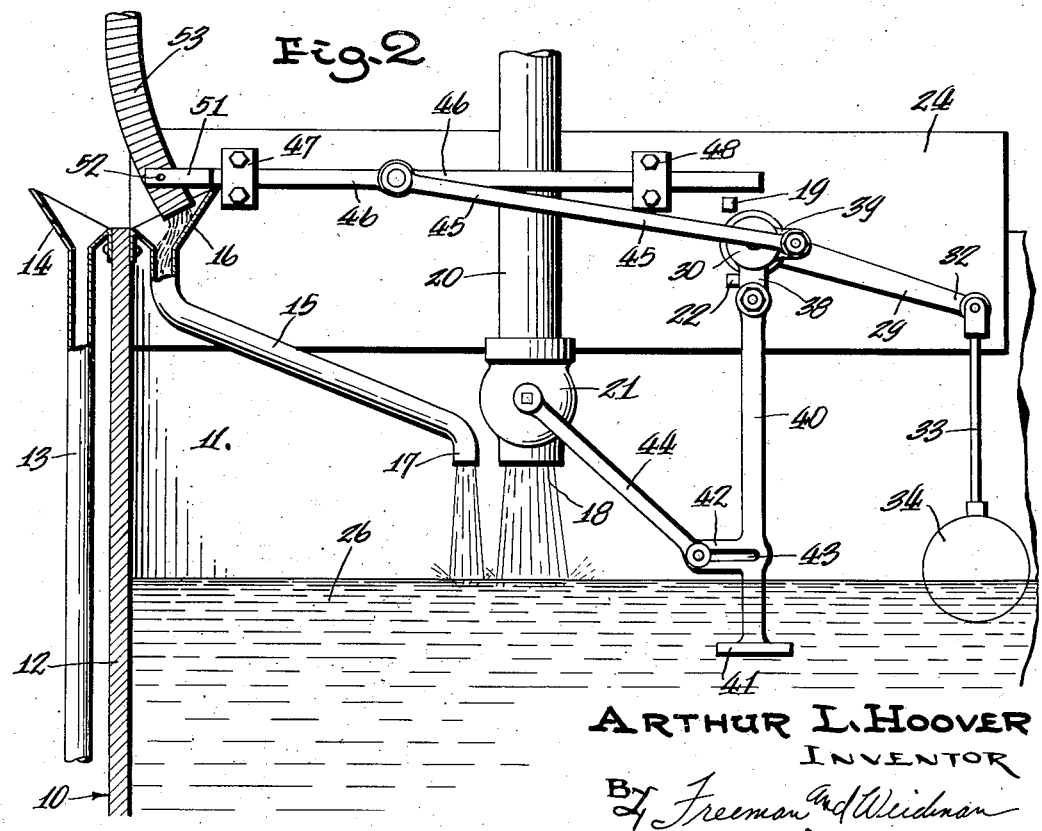

In the drawings accompanying this specification and forming a part of this application I have shown, for purposes of illustration, one form which my invention may assume, and in these drawings:

Figure 1 is a side elevational view partly in section of one embodiment of the invention, showing the device in one operative position, Figure 2 is a view similar to that shown in Figure 1, showing the device in another operative position, Figure 3 is a top plan view, corresponding substantially to the line 3—3 of Figure 1, Figure 4 is an enlarged fragmentary horizontal sectional view corresponding substantially to the line 4—4 of Figure 1, Figure 5 is a vertical sectional view, corresponding substantially to the line 5—5 of Figure 4, illustrating the parts thereof in one operative position, while Figure 6 is a vertical sectional view, similar to that shown in Figure 5, but illustrating the parts thereof in another operative position.

The embodiment of the invention herein disclosed is employed in controlling the flow of liquid chlorine and raw water into a settling tank 10, not completely shown, having a side wall 11 and end wall 12, and secured to the exterior surface of the end wall 12 is a conduit 13 having a flared inlet 14 into which liquid chlorine may be directed and conveyed to a sewage disposal plant, or other treating areas, (not shown) and secured to the inner surface of the end wall 12 is a conduit 15 having a flared inlet 16 disposed opposite to the flared inlet 14, and in which liquid chlorine may be discharged and conveyed through the conduit 15 under action of gravity to the end 17 thereof to be discharged into the settling tank 10. The conduits 13 and 15 are constructed of a material that is not affected by liquid chlorine.

Raw water is introduced into the settling tank 10 through a conduit 20 having its discharge outlet 18 adjacent the liquid chlorine outlet 17, and the conduit 20 is provided with a rotary valve 21 which controls the flow of the raw water into the settling tank 10.

Secured to the side wall 11 of the settling tank 10 is a panel 24 upon which is mounted a bracket 25 extending laterally therefrom over the surface of the water 26 in the settling tank 10, and threaded into the outer extremity of the bracket 25 is a bolt 27 which pivotally supports one end 28 of a float beam 29 and a rotatably mounted member 30 which is spaced from the float beam 29 by a spacer 31 interposed therebetween. The rotatable member 30 is free to travel 180 degrees and is prevented from further movement by abutting against stops 19 and 22 mounted on the panel 24.

Pivotally secured to the opposite end 32 of the float beam 29 is a downwardly extending link 33 at the lower end of which is affixed a float ball 34 normally floating in the water 26.

The end 28 of the float beam 29 is provided with a laterally projecting lug 35 adapted to move, when in different operative positions, a lug 36 and a lug 37 extending laterally from the rotatable member 30. The rotatable member 30 is also provided with spaced radially projecting eccentrics 38 and 39, the eccentric 38 being perforated for pivotal connection with an actuating element 40 extending downwardly into the water 26, and the element 40 is provided at its lower end with a float 41 of substantial weight, and the float-weight 41 is at all times submerged in the water 26. Projecting transversely from the actuating element 40, between the ends thereof, is a boss 42 having a laterally extending elongated slot 43 for the pivotal and sliding accommodation of one end of a link 44, the opposite end of which is operatively connected to the rotary valve 21, and the link 44 is adapted to open the valve 21 when in the position shown in Figure 2, and to close the same when in the position shown in Figure 1.

Pivotally connected to the eccentric 39 is a link 45 which is also pivotally secured to a slide bar 46, slidably supported in guides 47 and 48, respectively carried by brackets 49 and 50, mounted on the panel 24. One end of the slide bar 46 terminates in a longitudinally extending yoke 51 and journaled in the arms thereof is a pin 52 extending laterally from the side walls of a flexible conduit 53 leading from the supply of liquid chlorine, and the discharge opening in the flexible conduit 53 is adapted to be shifted so as to discharge the liquid chlorine into either one of the conduits 13 or 15.

In operation, assuming the settling tank 10 is filled to the desired proportional capacity with liquid chlorine and raw water, and that the actuating member 40 is in elevated buoyant position, as shown in Figure 1, the valve 21 closed and the conduit 53 so disposed that liquid chlorine is being discharged in the conduit 13 and to another treating area; under these conditions the actuating element 40 is disposed in the water 26 with its normal float line level with the surface of the water 26 and is supported in this buoyant position by the amount of water displaced thereby, and the actuating element 40 is locked in its elevated position since it is disposed in alignment with the axis of rotation of the rotatable member 30 and the axis of the eccentric connection 38.

When the water is being withdrawn from the settling tank 10, its level moves below the normal float line of the actuating element 40 and the amount of the liquid displaced by the actuating element 40 becomes less than the effective weight of the actuating member 40, and at the same time the float beam 29 swings in clockwise direction, and when the water 26 has reached its predetermined low level, the lug 35 carried by the float beam 29 engages the lug 37 on the rotatable member 30 and moves the eccentric connection 38 and the rotatable member 30 out of dead position, permitting the rotatable member 30 to rotate in clockwise direction, and the actuating member 40 is then free to fall further into the water 26 and it descends therein until it has displaced its own weight of the water 26, in which position its normal float line is level with the water 26, as shown in Figure 2.

Upon downward movement of the actuating element 40, the link 44 is moved in clockwise direction to open the valve 21 and the slide bar 46 is simultaneously shifted to the right, as viewed in Figure 2, shifting the conduit 53 to discharge liquid chlorine in predetermined proportional amounts to the raw water entering the settling tank 10.

The actuating element 40 is locked in depressed position, as viewed in Figure 2, since it is disposed in alignment with the axis of the eccentric 38 and the axis of rotation of the rotatable member 30, and the actuating member 40 remains in this depressed locked position as the water rises in the settling tank 10 and passes above the normal float line of the actuating member 40, whereby the latter displaces an amount of water 26 greater than its effective weight and accordingly the actuating member 40 has a tendency to rise out of the water 26 to its normal float line. When the water 26 has reached its predetermined high level, the float 34 moves the lug 36 which trips the actuating element 40 out of dead center and the excessive buoyant force exerted by the excessive amount of displaced water forces the actuating element 40 up to its normal float line, in which position the actuating element is again disposed at dead center, the valve 21 being moved to closed position during the upward stroke of the actuating element 40 and the conduit 53 simultaneously shifted into fluid communication with the conduit 15 and another treating area, not shown.

It will be perceived that my device controls in predetermined proportions the amounts of water and liquid chlorine supplied to the settling tank, and that the operation of my mechanism is controlled by the extent of the submersion of the actuating element 40 in the water 26 to move it to different operative positions, depending upon the over or under weight of the liquid displaced.

It will be understood by those skilled in the art that I have accomplished at least the principal object of my invention, and at the same time it will be obvious that the embodiment of my invention herein disclosed and described embodies advantages other than those particularly pointed out or suggested herein, and that it may be variously changed and modified without departing from the spirit of my invention or sacrificing the advantages thereof; accordingly it will be understood by those skilled in the art that the disclosure herein is illustrative only and that my invention is not limited thereto.

I claim:

1. A device of the character described, comprising: a container; means for supplying liquid to be treated to said container; means for supplying a treating substance to said container; mechanism, controlling in predetermined proportions the amounts of said liquid and of said treating substance supplied to said container, including an actuating element changeable in position dependent upon the quantity of liquid in said container, and operable when moved in one direction to place said mechanism in one operative position, and when moved in an opposite direction to place said mechanism in a different operative position, and including means for holding said actuating element against change in either of its operative positions; and a float disposed in the liquid in said container and operable at predetermined levels of the liquid in said container for tripping said holding means, permitting said actuating element to move to its opposite operative position.

2. A device of the character described, comprising: a container; means for supplying liquid to be treated to said container; means for supply a treating substance to said container; mechanism, controlling in predetermined proportions the amounts of said liquid and of said treating substance supplied to said container, including a rotatable member and an actuating element eccentrically connected to said rotatable member, said actuating element being changeable in position dependent upon the extent of submersion in the liquid in said container, and operable when moved in one direction to place said mechanism in one operative position, and when moved in an opposite direction to place said mechanism in a different operative position, and operable to rotate said rotatable member in said opposite directions, said actuating element being held against change in either of its operative positions when the direction of movement of said actuating element and the axis of said rotatable member and the axis of said eccentric connection are in alignment; and a control element operable at predetermined levels of the liquid in said container for tripping said rotatable member and said eccentric connection out of alignment, permitting said actuating element to move to its opposite operative position.

3. A device of the character described, comprising: a container; conduit means for supplying liquid to be treated to said container; valve means for controlling the flow of said liquid; conduit means for supplying a treating substance to said container; an actuating element, changeable to different operative positions dependent upon the extent of submersion in the liquid in said container, and controlled in its change to said different operative positions by the amount of liquid displaced thereby, said actuating element being operable to control the operation of said valve means and to interrupt the flow of said treating substance, to thereby supply predetermined proportional amounts of said liquid and of said treating substance to said container.

4. A device of the character described, comprising: a container; means for supplying liquid to said container; mechanism controlling the amount of said liquid supplied to said container, including a rotatable member and an actuating element eccentrically connected to said rotatable member, said actuating element being changeable to different operative positions dependent upon the extent of submersion in the liquid in said container, and controlled in its change to said different operative positions by the amount of liquid displaced thereby, and operable when moved in one direction to place said mechanism in one operative position, and when moved in an opposite direction to place said mechanism in a different operative position, and operable to rotate said rotatable member in said opposite directions, said actuating element being held against change in either of its operative positions when the direction of movement of said actuating element and the axis of said rotatable member and the axis of said eccentric connection are in alignment; and a control element operable at predetermined levels of the liquid in said container for tripping said rotatable member and said eccentric connection out of alignment, permitting said actuating element to move to its opposite operative position.

5. A device of the character described, comprising: a container; means for supplying liquid to be treated to said container; means for supplying a treating substance to said container; and mechanism, controlling in predetermined proportions the amounts of said liquid and of said treating substance supplied to said container, including a rotatable member and an actuating element eccentrically connected to said rotatable member, said actuating element being changeable in position dependent upon the quantity of liquid in said container, and operable when moved in one direction to place said mechanism in one operative position, and when moved in a different direction to place said mechanism in a different operative position, and operative to rotate said rotatable member in said different directions, said actuating element being held against change in either of its operative positions when the direction of movement of said actuating element and the axis of said rotatable member and the axis of said eccentric connection are in alignment.

6. A device of the character described, comprising: a container; means for supplying liquid to be treated to said container; means for supplying a treating substance to said container; mechanism, controlling in predetermined proportions the amounts of said liquid and of said treating substance supplied to said container, including an actuating element changeable in position dependent upon the quantity of liquid in said container, and operable when moved to one position to place said mechanism in one operative position, and when moved to another position to place said mechanism in a different operative position, and including means for holding said actuating element against change in either of its operative positions; and a control element operable at predetermined levels of the liquid in said container for tripping said holding means, permitting said actuating element to move to a different position.

7. A device of the character described, comprising: a container; conduit means for supplying liquid to be treated to said container; valve means for controlling the flow of said liquid; conduit means for supplying a treating substance to said container; and an actuating element, changeable to different operative positions dependent upon the quantity of liquid in said container, said actuating element being operable to control the operation of said valve means and to interrupt the flow of said treating substance, to thereby supply predetermined proportional amounts of said liquid and of said treating substance to said container.

8. A device of the character described, comprising: a container; conduit means for supplying liquid to be treated to said container; valve means for controlling the flow of said liquid; conduit means for supplying a treating substance to said container; an actuating element, changeable to different operative positions dependent upon the quantity of liquid in said container; and means for locking said actuating element against change from its different operative positions, until a predetermined quantity of said liquid and said treating substance is had in said container; said actuating element being operable to control the operation of said valve means and to interrupt the flow of said treating substance, to thereby supply predetermined proportional amounts of said liquid and of said treating substance to said container.

9. A device of the character described, comprising: a treating receptacle; means for supplying liquid to be treated to said treating receptacle; means communicable with said treating receptacle for supplying a flowing treating substance to said treating receptacle; mechanism, operable to divert the flow of said flowing treating substance into and out of said treating receptacle to supply predetermined proportional amounts of said liquid and of said treating substance to said treating receptacle, said mechanism including an actuating element changeable to different operative positions dependent upon the extent of submersion in the liquid in said treating receptacle, and controlled in its change to said different operative positions by the amount of liquid displaced thereby, and operable when moved in one direction to place said mechanism in one operative position, and when moved in an opposite direction to place said mechanism in a different operative position, and including means for holding said actuating element against change in either of its operative positions; and a control element operable at predetermined levels of the liquid in said treating receptacle for tripping said holding means, permitting said actuating element to move to its opposite operative position.

10. Apparatus of the character described, comprising: a receptacle for liquid, and from which liquid may be withdrawn; means for replenishing the supply of liquid in said receptacle; a shiftable conduit, in one position adapted to supply a treating substance to the liquid in said receptacle; buoyant means immersed in the liquid of said receptacle and responsive to fall in the level of said liquid; means for holding said buoyant means against rise with the level of liquid in said receptacle; means for releasing said buoyant means at a predetermined time; and operative connections between said replenishing means, said shiftable conduit, and said buoyant means for controlling the position of said shiftable conduit and the operation of said replenishing means.

11. Apparatus of the character described, comprising: a receptacle for liquid, and from which liquid may be withdrawn; means for replenishing the supply of liquid in said receptacle, in a first position operable to furnish liquid to said receptacle, and in a second position to cut off the supply of liquid; a flexibly mounted constantly flowing conduit, in a first position operable to supply a treating substance to the liquid in said receptacle, and in a second position operable to discharge exteriorly of said receptacle; buoyant means immersed in the liquid of said receptacle and responsive to fall in the level of said liquid; operative connections between said replenishing means, said conduit, and said buoyant means, operable upon fall of said buoyant means to dispose said replenishing means and said conduit in their first positions, and operable upon rise to place the same in their second positions; means operable at a predetermined low level, for holding said buoyant means against rise with the level of liquid in said receptacle; and means for releasing said buoyant means when said liquid reaches a predetermined high level.

12. A device of the character described, comprising: a liquid container; buoyant means immersed in the liquid in said container; control means for controlling the level of liquid in said container, said control means being so constructed and arranged that in one phase of operation and in a first position said buoyant means displaces only sufficient liquid to float the same, and in another phase of operation is held in a second position to displace a greater quantity of liquid when the liquid level rises in said container, said control means being actuated when released through power generated by said buoyant means in moving from its second to its first position; means for releasing said buoyant means at a predetermined time; and means controlled by the position of said buoyant means for supplying treating substance to the liquid in said container.

ARTHUR L. HOOVER.